(12) United States Patent
Takenaka et al.

(10) Patent No.: US 10,845,881 B2
(45) Date of Patent: Nov. 24, 2020

(54) INFORMATION PROCESSING APPARATUS, INFORMATION PROCESSING METHOD, AND INFORMATION PROCESSING SYSTEM FOR PRESENTATION OF HAPTIC FEEDBACK WITH RESPECT TO AN OBJECT BASED ON THE ELECTRONIC INFORMATION

(71) Applicants: SONY CORPORATION, Tokyo (JP); SONY MOBILE COMMUNICATIONS INC., Tokyo (JP); Ryosuke Nomura

(72) Inventors: Mikio Takenaka, Kanagawa (JP); Ryosuke Murakami, Tokyo (JP); Hideaki Hayashi, Aichi (JP); Akira Ono, Kanagawa (JP); Ryo Yokoyama, Tokyo (JP); Ryosuke Takeuchi, Saitama (JP); Seiji Muramatsu, Saitama (JP); Mioko Ambe, Tokyo (JP); Kazutoshi Ohno, Kanagawa (JP); Tetsuya Naruse, Kanagawa (JP); Tetsuya Takahashi, Kanagawa (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/327,101

(22) PCT Filed: Jun. 27, 2017

(86) PCT No.: PCT/JP2017/023472
§ 371 (c)(1),
(2) Date: Feb. 21, 2019

(87) PCT Pub. No.: WO2018/051606
PCT Pub. Date: Mar. 22, 2018

(65) Prior Publication Data
US 2019/0204928 A1 Jul. 4, 2019

(30) Foreign Application Priority Data
Sep. 14, 2016 (JP) ................................ 2016-179144

(51) Int. Cl.
*G08B 6/00* (2006.01)
*G06F 3/01* (2006.01)
(Continued)

(52) U.S. Cl.
CPC ......... *G06F 3/016* (2013.01); *G01R 31/3646* (2019.01); *G06F 3/01* (2013.01); *G06Q 20/367* (2013.01); *H04M 1/72569* (2013.01)

(58) Field of Classification Search
None
See application file for complete search history.

(56) References Cited

U.S. PATENT DOCUMENTS

2011/0187658 A1 5/2011 Song et al.
2011/0316724 A1 12/2011 Morieda
(Continued)

FOREIGN PATENT DOCUMENTS

| CN | 103842937 A | 6/2014 |
|---|---|---|
| JP | 2008129835 A | 6/2008 |

(Continued)

OTHER PUBLICATIONS

International Search Report in PCT/JP2017/023472 dated Sep. 5, 2017.

*Primary Examiner* — John F Mortell
(74) *Attorney, Agent, or Firm* — Chip Law Group

(57) ABSTRACT

An information processing apparatus according to the present technology includes an information acquisition unit and
(Continued)

a signal output unit. The information acquisition unit acquires electronic information. The signal output unit outputs a first haptic signal for presenting haptic feedback with respect to an object, the haptic feedback with respect to the object being set corresponding to the acquired electronic information.

13 Claims, 12 Drawing Sheets

(51) Int. Cl.
*H04M 1/725* (2006.01)
*G01R 31/36* (2020.01)
*G06Q 20/36* (2012.01)

(56) References Cited

U.S. PATENT DOCUMENTS

| | | | |
|---|---|---|---|
| 2012/0028577 A1* | 2/2012 | Rodriguez | H04M 1/725 455/41.1 |
| 2012/0218089 A1* | 8/2012 | Hill | H04M 1/72572 340/407.1 |
| 2014/0300562 A1 | 10/2014 | Tanaka et al. | |
| 2015/0019976 A1* | 1/2015 | Lee | G06F 3/017 715/733 |

FOREIGN PATENT DOCUMENTS

| | | |
|---|---|---|
| JP | 2010015551 A | 1/2010 |
| JP | 2015090516 A | 5/2015 |
| JP | 2015215795 A | 12/2015 |
| WO | 2010095372 A1 | 8/2010 |
| WO | 2013051662 A1 | 4/2013 |

* cited by examiner

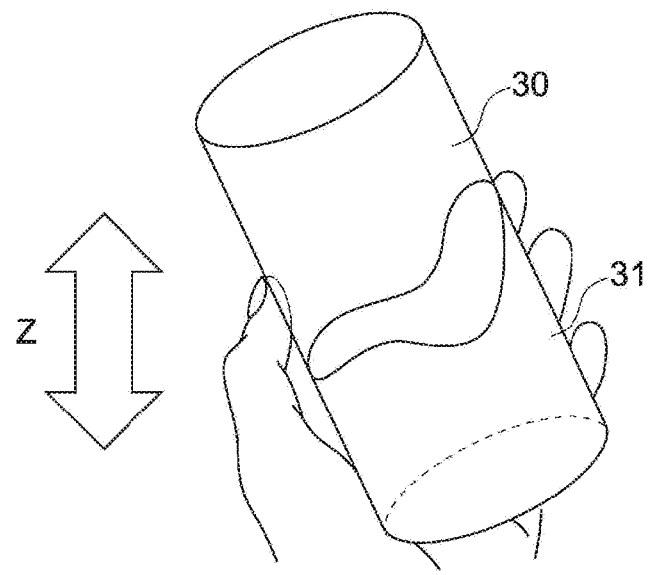
FIG. 6A
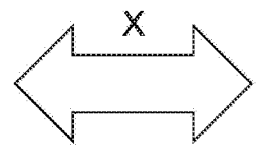
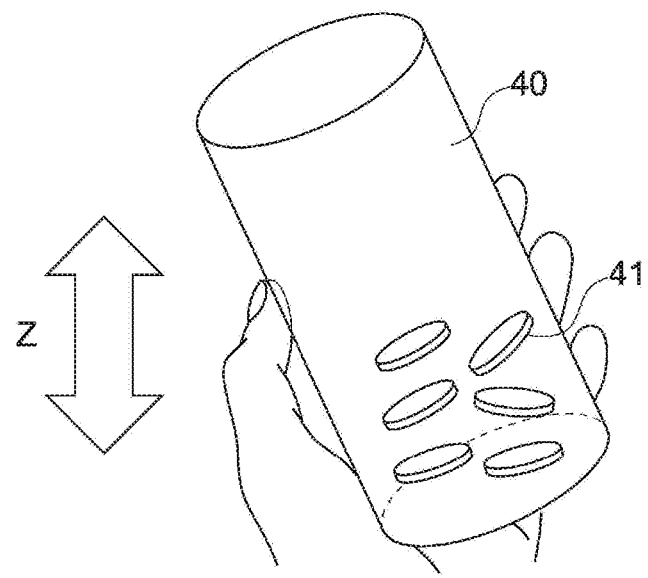
FIG. 6B
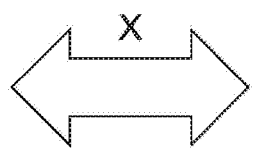
FIG. 6

| Action (first) | Preliminary Vibration | Action (second) | Preliminary Vibration | Action (third) | Preliminary Vibration | Presentation |
|---|---|---|---|---|---|---|
| Lift | Vibration once | No action | | | | Buttery |
| Lift | Vibration once | Shake | Vibration twice | No action | | Money |
| Shake | Vibration twice | No action | | | | Money |
| Shake | Vibration twice | Shake | Vibration three times | No action | | Weather |
| Shake | Vibration twice | Shake | Vibration three times | Shake | Vibration once | Buttery |
| Horizontally lift | Vibration three times | No action | | | | Weather |

FIG.7

INFORMATION PROCESSING APPARATUS, INFORMATION PROCESSING METHOD, AND INFORMATION PROCESSING SYSTEM FOR PRESENTATION OF HAPTIC FEEDBACK WITH RESPECT TO AN OBJECT BASED ON THE ELECTRONIC INFORMATION

CROSS REFERENCE TO RELATED APPLICATIONS

This application is a U.S. National Phase of International Patent Application No. PCT/JP2017/023472 filed on Jun. 27, 2017, which claims priority benefit of Japanese Patent Application No. JP 2016-179144 filed in the Japan Patent Office on Sep. 14, 2016. Each of the above-referenced applications is hereby incorporated herein by reference in its entirety.

TECHNICAL FIELD

The present technology relates to an information processing apparatus, an information processing method, a program, and an information processing system capable of presenting information to a user.

BACKGROUND ART

In the related art, a haptic (haptic feedback) technology that transfers information to a human through human's haptics has been proposed (for example, see Patent Literature 1).

CITATION LIST

Patent Literature

Patent Literature 1: Japanese Patent Application Laid-open No. 2011-159280

DISCLOSURE OF INVENTION

Technical Problem

Thus, it is demanded to provide a technology that allows a user to intuitively grasp information.

Solution to Problem

The present technology is made in view of the above-mentioned circumstances, and it is an object of the present technology to provide an information processing apparatus, an information processing method, a program, and an information processing system that allows a user to intuitively grasp information.

Solution to Problem

In order to achieve the object, an information processing apparatus according to an embodiment of the present technology includes an information acquisition unit and a signal output unit.

The information acquisition unit acquires electronic information.

The signal output unit outputs a first haptic signal for presenting haptic feedback with respect to an object, the haptic feedback with respect to the object being set corresponding to the acquired electronic information.

In the information processing apparatus, it becomes possible to replace the electronic information with the haptic feedback with respect to the object and to present the haptic feedback with respect to the object. With this configuration, a user can intuitively grasp the information through presented haptic feedback.

The haptic feedback with respect to the object may include haptic feedback with respect to a container that contains the object corresponding to the acquired electronic information.

With this configuration, it becomes possible to intuitively grasp the information through haptic feedback corresponding to the object contained in the container.

The electronic information may include a type of information and an amount. In this case, the haptic feedback with respect to the object may include haptic feedback that appears when the container that contains the object corresponding to the type of information of an amount corresponding to the amount is moved.

With this configuration, it becomes possible to intuitively grasp the presented type of information and the amount.

The information processing apparatus may further include a motion detector that detects a motion of the information processing apparatus. In this case, the signal output unit may output the first haptic signal for presenting the haptic feedback that appears when the container is moved on the basis of the detected motion of the information processing apparatus.

With this configuration, it becomes possible to present the haptic feedback that appears when the information processing apparatus is moved considering as the container and to intuitively grasp the information.

The electronic information may include a remaining battery charge. In this case, the haptic feedback with respect to the object may include haptic feedback that appears when the container that contains liquid of an amount corresponding to the remaining battery charge is moved.

With this configuration, it becomes possible to intuitively grasp the remaining battery charge.

The electronic information may include an electronic money balance. In this case, the haptic feedback with respect to the object may include haptic feedback that appears when the container that contains coins of an amount corresponding to the electronic money balance is moved.

With this configuration, it becomes possible to intuitively grasp the electronic money balance.

The signal output unit may output, as the first haptic information, a drive signal for driving a haptic feedback presentation unit that presents the haptic feedback with respect to the object by a vibration.

By the vibration, it is possible to easily present the replaced haptic feedback with respect to the object.

The information acquisition unit may acquire the electronic information in a case where a predetermined motion of the information processing apparatus is detected.

With this configuration, by moving the information processing apparatus by the user, it becomes possible to execute presentation of the information and to easily grasp the information.

The information processing apparatus may further include an information selection unit that selects a type of the electronic information acquired by the information acquisition unit on the basis of the detected motion of the information processing apparatus.

With this configuration, by moving the information processing apparatus by the user, it becomes possible to select the information desired to be grasped.

The signal output unit may output a second haptic signal for presenting haptic feedback corresponding to the type of the electronic information selected by the information selection unit.

With this configuration, the user can intuitively grasp the information to be presented through the haptic feedback.

An information processing method according to an embodiment of the present technology is executed by a computer system and includes acquiring electronic information.

A first haptic signal for presenting haptic feedback with respect to an object is outputted. The haptic feedback with respect to the object is set corresponding to the acquired electronic information.

A program according to an embodiment of the present technology causes a computer system to execute steps of: acquiring electronic information, and outputting a first haptic signal for presenting haptic feedback with respect to an object, the haptic feedback with respect to the object being set corresponding to the acquired electronic information.

An information processing system according to an embodiment of the present technology includes a first information processing apparatus and a second information processing apparatus.

The first information processing apparatus acquires electronic information.

The second information processing apparatus is capable of communicating with the first information processing apparatus and outputs a first haptic signal for presenting haptic feedback with respect to an object, the haptic feedback with respect to the object being set corresponding to the electronic information acquired by the first information processing apparatus.

Advantageous Effects of Invention

As described above, the present technology allows a user to intuitively grasp information. It should be noted that the effects described here are not necessarily limitative and may be any of effects described in the present disclosure.

BRIEF DESCRIPTION OF DRAWINGS

FIG. 6 are views describing haptic feedback presented corresponding to a remaining battery charge and an electronic money balance.

FIG. 7 is a table schematically showing a relationship between different combinations of motions of the information processing apparatus and types of information to be presented in a second embodiment.

MODE(S) FOR CARRYING OUT THE INVENTION

Hereinafter, embodiments of the present disclosure will be described with reference to the drawings.

First Embodiment

[Configuration of Information Processing Apparatus]

Figure 1:
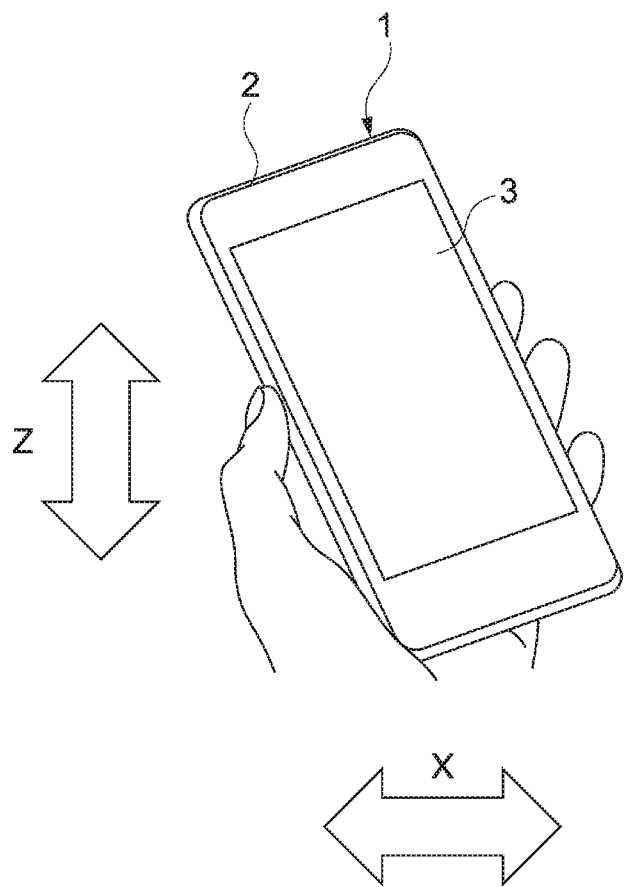
FIG. 1 is a view showing an appearance of an information processing apparatus according to a first embodiment of the present technology.
Figure 2:
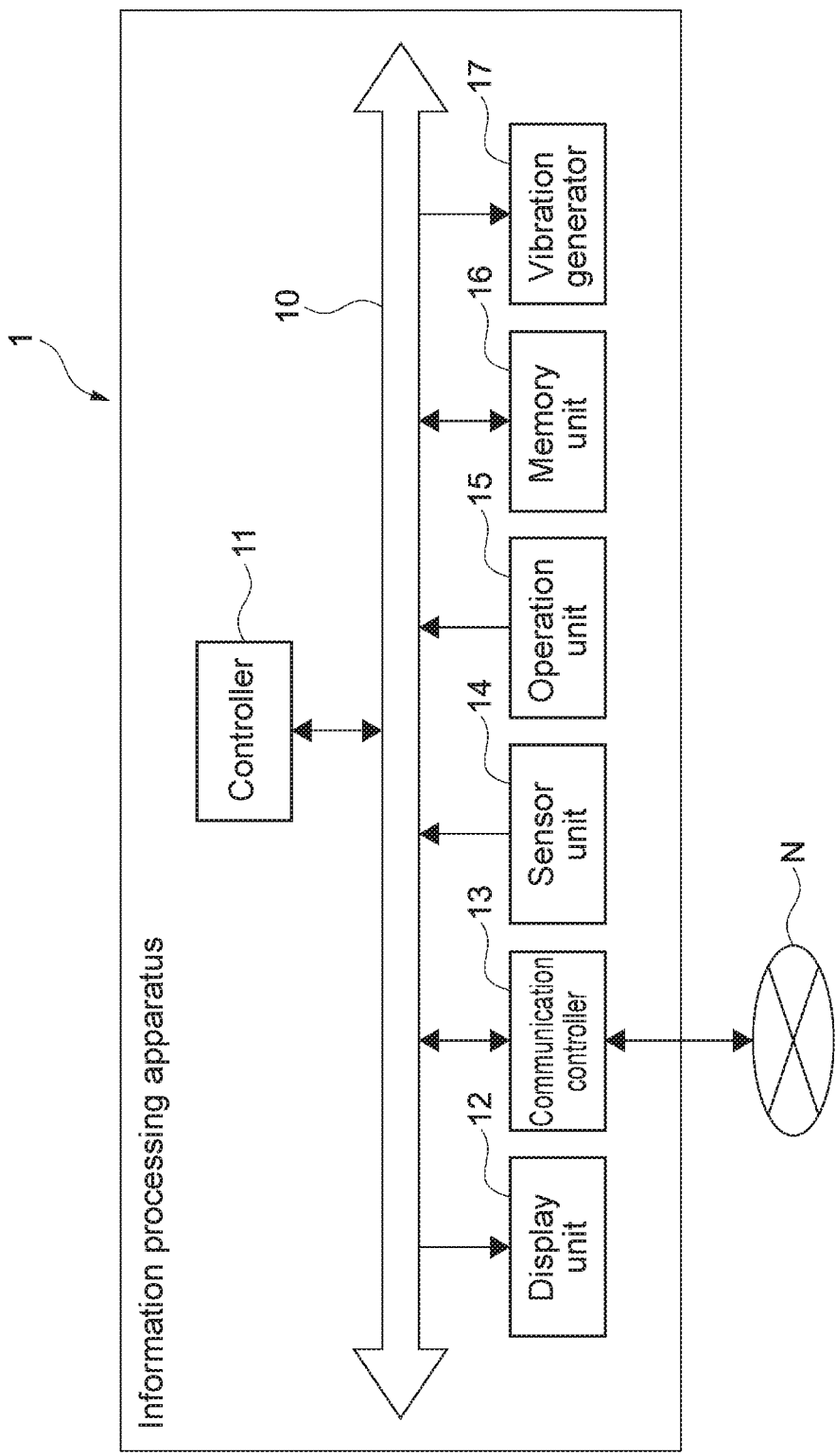
FIG. 2 is a block diagram showing a configuration example of hardware of the information processing apparatus.

FIG. 1 is a view showing an appearance of an information processing apparatus according to a first embodiment of the present technology. FIG. 2 is a block diagram showing a configuration example of hardware of the information processing apparatus.

The information processing apparatus 1 is typically a hand-held mobile information terminal, e.g., a smartphone that is assumed to be gripped with one hand. In addition, a tablet type mobile information terminal larger than the smartphone, a wearable mobile information terminal, e.g., a smartwatch, or the like may be used. Furthermore, the present technology is applicable to any computer.

As shown in FIG. 1, the information processing apparatus 1 includes a housing 2 and a touch panel 3. For example, a user operates the touch panel 3 while gripping the housing 2. Also, the user can lift the information processing apparatus 1 in the direction including a vertical component (Z direction) or can shake the information processing apparatus 1 in the direction including a horizontal component (X direction) while the user grips the housing 2. As a matter of course, other motions are also possible.

As shown in FIG. 2, the information processing apparatus 1 includes a controller 11, a display unit 12 connected to the controller 11 via a bus 10, a communication controller 13, a sensor unit 14, an operation unit 15, a memory unit 16, and a vibration generator 17. These are housed in the housing 2.

The controller 11 includes a CPU (Central Processing Unit) and the like. The CPU (Central Processing Unit) of the controller 11 loads a program into a RAM (Random Access Memory) and executes the program. The program is stored in a ROM (Read Only Memory) that is an example of a computer-readable non-transitory storage medium.

The memory unit 16 includes large capacity storage devices such as the ROM (Read Only Memory), the RAM, and an HDD (Hard Disk Drive). The ROM fixedly stores the program or data executed by the controller 11. The program stored in the ROM is loaded into the RAM.

The memory unit 16 stores a variety of information for executing an information presentation method that is the information processing method according to the present technology. For example, the memory unit 16 stores information of "haptic feedback with respect to an object" set corresponding to information that is presented to a user. The "haptic feedback with respect to the object" is haptic feedback that is assumed in a case where a user comes in contact with an object in the real world, a user moves an object, or the like. The information for presenting the haptic feedback is stored.

In this embodiment, by vibrating at least a part of the housing 2 and/or the touch panel 3 (contact object) with the vibration generator 17, the haptic feedback is presented to the user. By controlling a frequency, amplitude (intensity), or the like of a vibration to be generated as appropriate, it is possible to reproduce and present a variety of the haptic feedback with respect to the object. The information of the "haptic feedback with respect to the object" includes waveform information including the frequency or the amplitude (intensity) of the vibration and information about a waveform change, or the like.

The display unit 12 includes an LCD (Liquid Crystal Display), an organic EL (Electroluminescence) display, or the like. The display unit 12 performs arithmetic processing on the basis of the information received from the controller 11 and displays a generated image signal on a screen.

The operation unit 15 includes the touch panel 3 superimposed with the display unit 12, a variety of physical switches, and the like. The operation unit 15 detects a user's operation (tapping operation of touch panel 3, etc.) and outputs to the controller 11.

The communication controller 13 is an interface for connecting to a network N, e.g., the Internet. For example, a wireless LAN module, e.g., WiFi is used. Note that the communication controller 13 may include a communication module for short-range wireless communication, e.g., the Bluetooth (registered trademark).

The sensor unit 14 includes an acceleration sensor, a gyro sensor, and a microphone, and one or more amplifiers. The acceleration sensor detects a direction of movement and a speed of the information processing apparatus 1. The gyro sensor detects an angle (attitude), an angular velocity, and an angular acceleration of the information processing apparatus 1. The microphone detects a vibration of the information processing apparatus 1. The amplifier amplifies the information acquired by the acceleration sensor, the gyro sensor, and the microphone and outputs to the controller 11. Other devices may be used.

Figure 3:
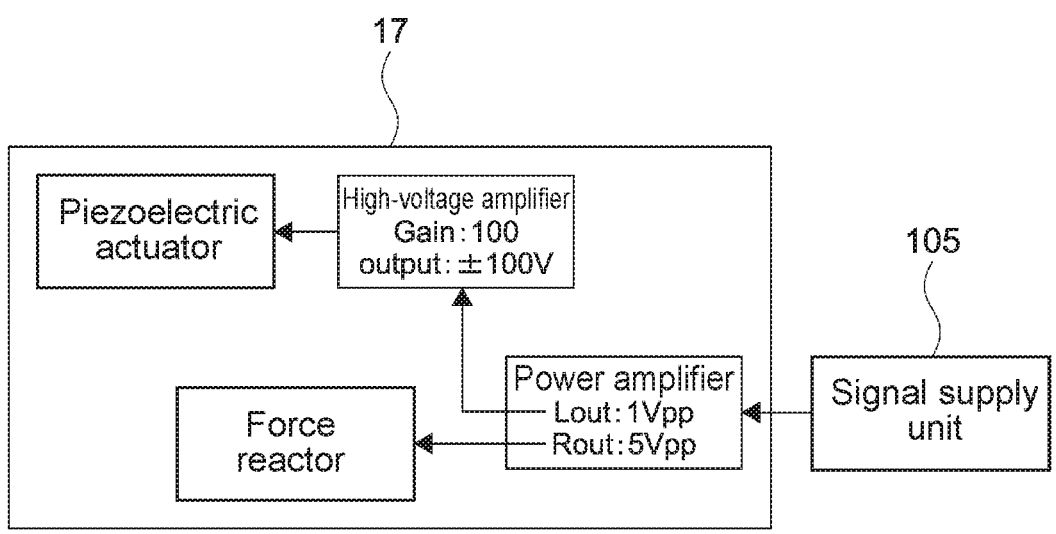
FIG. 3 is a diagram showing an electrical configuration example of a vibration generator.

FIG. 3 is a diagram showing an electrical configuration example of the vibration generator according to this embodiment. The vibration generator 17 includes a power amplifier, a high-voltage amplifier, a piezoelectric actuator, and the Force reactor (registered trademark). The power amplifier amplifies a drive signal inputted from a signal supply unit 105 (see FIG. 4) and outputs to the high-voltage amplifier and the Force reactor.

The high-voltage amplifier amplifies the drive signal inputted from the power amplifier and outputs to the piezoelectric actuator. The piezoelectric actuator and the Force reactor convert inputted electric energy to mechanical energy and generate the vibration. Thus, it will be possible to vibrate the housing 2 and the like and to present the haptic feedback corresponding to the information to be presented. Note that in order to freely vibrate a variety of components of the information processing apparatus 1 with a variety of waveforms, the piezoelectric actuators and the Force reactors may be arranged in a plurality of positions.

The configuration of the vibration generator 17 is not limited and may be freely designed. For example, as the vibration generator 17, a haptic presentation device disclosed in WO/2015/151380 can be used. Other actuators having any configuration may be used. Note that the vibration generator 17 corresponds to a haptic feedback presentation unit in this embodiment.

Figure 4:
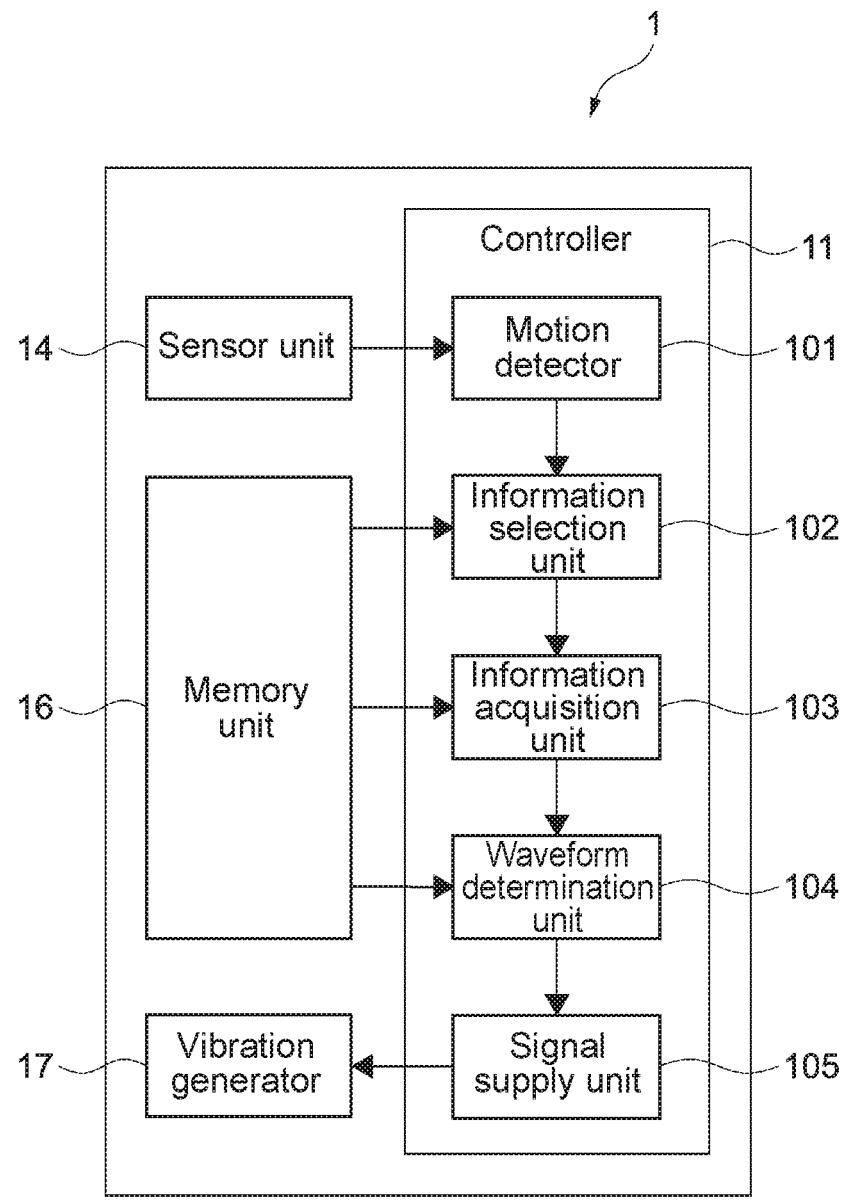
FIG. 4 is a block diagram showing a functional configuration example of the information processing apparatus.

FIG. 4 is a block diagram showing a functional configuration example of the information processing apparatus.

The controller 11 of the information processing apparatus 1 functions as a motion detector 101, an information selection unit 102, an information acquisition unit 103, a waveform determination unit 104, and the signal supply unit 105 by loading a program stored in the ROM that is an example of a computer-readable non-transitory storage medium into the RAM and executing the program.

The motion detector 101 detects a motion of the information processing apparatus 1 on the basis of a detection result of the sensor unit 14.

The information selection unit 102 selects a type of information to present on the basis of the motion of the information processing apparatus 1. In other words, a type of electronic information acquired by the information acquisition unit 103 is selected.

The information acquisition unit 103 acquires the electronic information to present.

The waveform determination unit 104 determines a waveform of the vibration for presenting the "haptic feedback with respect to the object" set corresponding to the electronic information.

The signal supply unit 105 supplies the vibration generator 17 with a drive signal for vibrating the housing 2 or the like with the waveform determined by the waveform determination unit 104. The signal supply unit 105 corresponds to a signal output unit in this embodiment. The supplied drive signal corresponds to a first haptic signal for presenting the "haptic feedback with respect to the object".

[Process Flow of Information Processing Apparatus]

Figure 5:
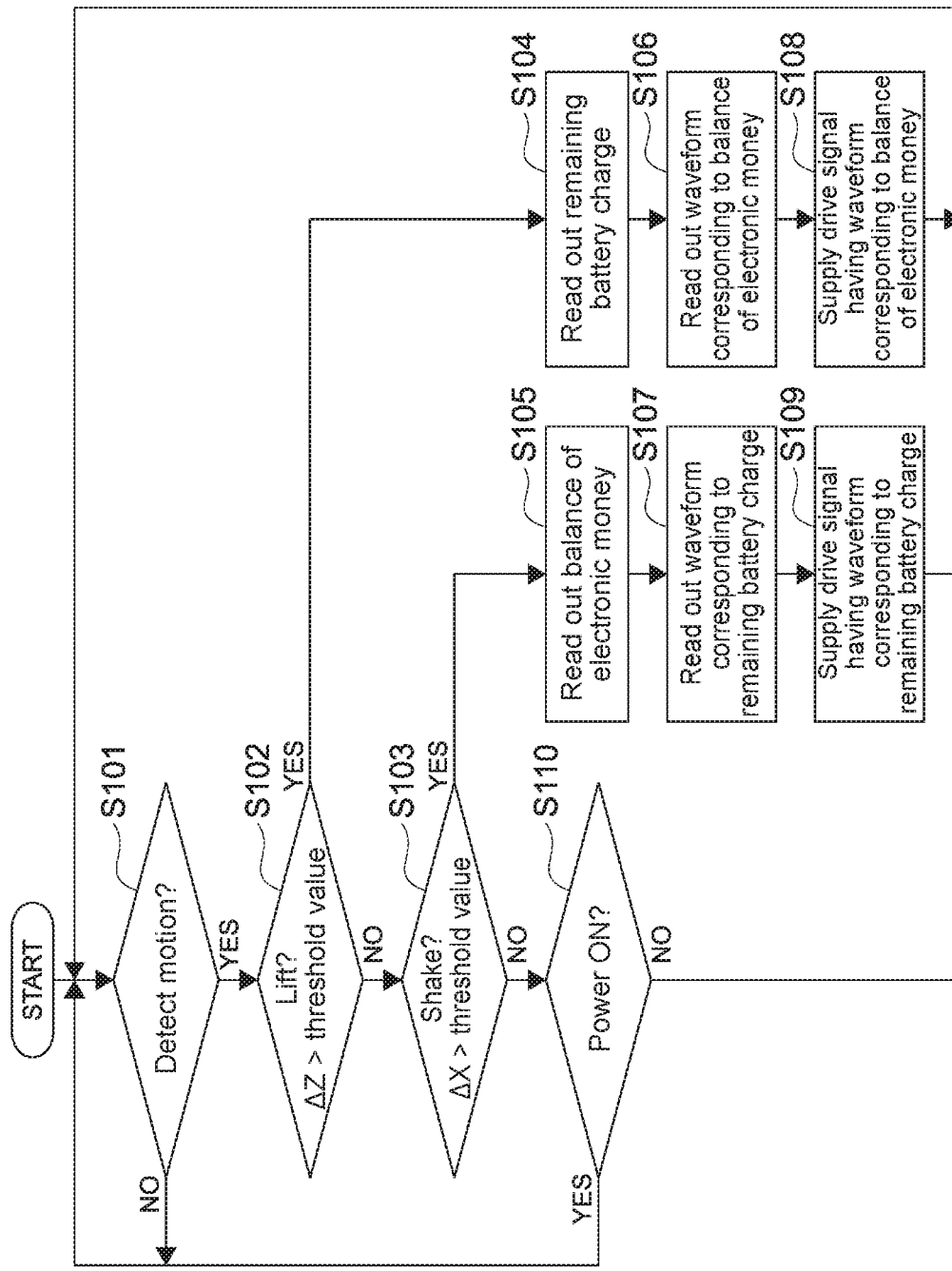
FIG. 5 is a flowchart showing a process flow of the information processing apparatus.

FIG. 5 is a flowchart showing a process flow of the information processing apparatus.

The motion detector 101 monitors the motion of the information processing apparatus 1 on the basis of the direction of movement and the speed of the information processing apparatus 1 detected by at least the acceleration sensor of the sensor unit 14 (Step 101). The "motion" of the information processing apparatus 1 includes at least the direction of movement and the speed. In a case where the motion of the information processing apparatus 1 is detected (Yes in Step 101), information about the motion of the information processing apparatus 1, i.e., information about the direction of movement and the speed is outputted to the information selection unit 102.

The information selection unit 102 selects a type of information to be presented on the basis of the direction of movement and the speed. In this embodiment, the type of information to be presented is selected in response to different motions of the information processing apparatus 1.

In the example shown in FIG. 5, in a case where a movement distance $\Delta Z$ of the information processing apparatus 1 in a direction including a vertical component (Z direction of FIG. 1) is greater than a predetermined threshold value (YES in Step S102), a remaining battery charge is selected as the type of information to be presented. Note that the "movement distance in a direction including a vertical component is greater than a predetermined threshold value" means that the user lifts the information processing apparatus 1.

In a case where the movement distance $\Delta Z$ is equal to or less of the predetermined threshold value (NO in Step S102), i.e., in a case where the information processing apparatus 1 is not lifted, the process proceeds to Step 103. Then, it is determined whether or not a movement distance $\Delta X$ of the information processing apparatus 1 in a direction including a horizontal component (X direction of FIG. 1) is greater than a predetermined threshold value (Step 103). The "movement distance in a direction including a horizontal component is greater than a predetermined threshold value" means that the user shakes the information processing apparatus 1.

In a case where the movement distance ΔX is equal to or more than the predetermined threshold value (YES in Step S103), i.e., in a case where the information processing apparatus 1 is shaken, an electronic money balance is selected as the type of information to be presented. The information selection unit 102 notifies the information acquisition unit 103 of the type of information to be presented (remaining battery charge or electronic money balance).

The information acquisition unit 103 acquires electronic information on the basis of a notification from the information selection unit 102. In a case where the remaining battery charge is notified (YES in Step S102), the information acquisition unit 103 reads out the electronic information showing the remaining battery charge at present (what percentage, %) from the memory unit 16 (Step S104). In a case where the electronic money balance is notified (YES in Step S103), the information acquisition unit 103 reads out the electronic information showing the electronic money balance at present (how many yen) from the memory unit 16 (Step S105). The read-out information (remaining battery charge or electronic money balance) is outputted to the waveform determination unit 104.

The waveform determination unit 104 acquires the electronic information (remaining battery charge or electronic money balance) from the information acquisition unit 103. The waveform determination unit 104 determines the waveform for presenting the "haptic feedback with respect to the object" set corresponding to every electronic information (Step S106, S107). Specifically, the waveform information stored corresponding to the remaining battery charge or the electronic money balance is read out from the memory unit 16.

FIG. 6 are views describing the haptic feedback presented corresponding to the remaining battery charge and the electronic money balance. The electronic information (remaining battery charge or electronic money balance) cannot be touched by a human. It is difficult to intuitively and recognizably present to the user the electronic information that cannot be touched by a human, in particular the information showing an amount, for example, by a haptic manner, through the haptic feedback. In this embodiment, the electronic information that cannot be touched by a human is virtually replaced with the haptic feedback with respect to a real object. The "haptic feedback with respect to the object" to be replaced may be an object to be assumed that is often touched by the user on a daily basis.

In this embodiment, the haptic feedback with respect to a container that contains the object corresponding to the type of information included in the electronic information by an amount corresponding to the amount included in the electronic information is used as the "haptic feedback with respect to the object". The haptic feedback that is assumed to appear when the container is moved is presented by a vibration.

As shown in FIG. 6A, the "haptic feedback with respect to the object" corresponding to the remaining battery charge is presented as the haptic feedback that appears when a container 30 that contains liquid 31 of an amount corresponding to the remaining battery charge is moved. As the container 30 that contains the liquid 31, a plastic bottle that contains water or the like is assumed, for example, but it is not limited thereto.

Everyone has an experience that in a case where the container 30 that contains the liquid 31 is moved by a hand, a shake of the liquid 31 in the container 30 is felt along with the motion of the hand. In addition, everyone has an experience that in a case where the liquid in the container 30 is shaken, the haptic feedback that appears when the liquid 31 attacks an inner wall of the container 30 is changed depending on the amount of the liquid 31, i.e., a large amount or a small amount.

In other words, even if a human does not view the liquid 31 in the container 30, the human can intuitively understand an analog amount of the liquid 31 in the container 30 by holding and moving the container 30 by a hand and feeling an analog vibration as haptically along with the vibration of the liquid 31 in the container 30. The reason is that, after the liquid 31 in the container 30 is shaken, the waveforms of the vibration generated by the liquid 31 impinging on the inner wall of the container 30 are different when the amount of the liquid 31 is small and when the amount of the liquid 31 is large.

In this embodiment, the waveform expressing the motions of the liquids 31 in the containers 30 when the liquids 31 in the amounts corresponding to the remaining battery charge are placed in the same containers 30 and the containers 30 are moved in a similar manner is simulated in advance. The "liquids in the amount corresponding to the remaining battery charge" means that there is a correlation (for example, proportion) between the remaining battery charge and the amount of the liquid 31 such that if the remaining battery charge is low, the amount of the liquid 31 is also small, and if the remaining battery charge is high, the amount of the liquid 31 is also large.

The waveform information acquired as a result of the simulation is stored in the memory unit 16 in advance. Specifically, a plurality of remaining battery charges and a plurality of pieces of waveform information acquired as the result of the simulation are correlated with each other, which are stored in the memory unit 16. The waveform determination unit 104 reads out from the memory unit 16 the wave information correlated with the remaining battery charge acquired from the information acquisition unit 103 (Step S106).

As shown in FIG. 6B, the "haptic feedback with respect to the object" corresponding to the electronic money balance is presented as the haptic feedback that appears when a container 40 that contains coins 41 of an amount corresponding to the electronic money balance is moved. As the container 40 that contains the coins 41, a piggy bank, a glass bottle or the like is assumed, for example, but it is not limited thereto.

Everyone has an experience that in a case where the container 40 that contains the coins 41 is moved by a hand, the movement of the coins 41 in the container 40 is felt along with the motion of the hand. In addition, everyone has an experience that in a case where the coins 41 in the container 40 are moved, the haptic feedback that appears when the coins 41 attack an inner wall of the container 40 is changed depending on the amount of the coins 41, i.e., a large amount or a small amount.

In other words, even if a human does not view the coins 41 in the container 40, the human can intuitively understand an analog amount of the coins 41 in the container 40 by holding and moving the container 40 by a hand and feeling an analog vibration as haptically along with the movement of the coins 41 in the container 40. The reason is that, after the coins 41 in the container 40 are moved, the waveforms of the vibration generated by the coins 41 impinging on the inner wall of the container 40 are different when the amount of the coins 41 is small and when the amount of the coins 41 is large.

In this embodiment, the waveform expressing the motions of the coins 41 in the containers 40 when the coins 41 in the amounts corresponding to the electronic money balance are placed in the same containers 40 and the containers 40 are moved in a similar manner is simulated in advance. The "coins in the amount corresponding to the electronic money balance" means that there is a correlation (for example, proportion) between the electronic money balance and the amount of the coins 41 such that if the electronic money balance is low, the amount of the coins 41 (the number of coins) is also small, and if the electronic money balance is high, the amount of the coins 41 (the number of coins) is also large.

The waveform information acquired as a result of the simulation is stored in the memory unit 16 in advance. Specifically, a plurality of balances of electronic money and a plurality of pieces of waveform information acquired as the result of the simulation are correlated with each other, which are stored in the memory unit 16. The waveform determination unit 104 reads out from the memory unit 16 the wave information correlated with the electronic money balance acquired from the information acquisition unit 103 (Step S107).

The waveform determination unit 104 supplies the signal supply unit 105 with the waveform information read out from the memory unit 16. The signal supply unit 105 acquires the waveform information from the waveform determination unit 104. The signal supply unit 105 supplies the vibration generator 17 with the drive signal for vibrating the contact object in this waveform (Step S108, S109).

If the information processing apparatus 1 is neither lifted (NO in Step S102) nor shaken (NO in Step S103) and a power supply is on (YES in Step S110), it stands-by until the motion is detected (NO in Step S101).

As described above, the information processing apparatus 1 according to this embodiment allows the electronic information that cannot be touched by a human to be replaced with and present the "haptic feedback with respect to the object". For example, through the haptic feedback corresponding to the movement of the liquid 31 acquired when the information processing apparatus 1 is moved, it becomes possible to intuitively grasp the remaining battery charge. In addition, through the haptic feedback corresponding to the movement of the coins 41 acquired when the information processing apparatus 1 is moved, it becomes possible to intuitively grasp the electronic money balance.

The electronic information cannot be touched by a human. It is difficult to intuitively and recognizably present the electronic information that cannot be touched by a human, in particular the information showing an amount, for example, by a haptic manner, through the haptic feedback. According to this embodiment, the electronic information that cannot be touched by a human is virtually replaced with the "haptic feedback with respect to the object" that can be haptically recognized and is assumed to be often touched by a human on a daily basis.

According to this embodiment, the electronic information that cannot be touched by a human (remaining battery charge, electronic money balance) is replaced with the haptic feedback that appears when the object (liquid, coins) is placed in the container and the container is moved. Everyone has an experience that in a case where the container that contains the object is moved by a hand, a shake of the object in the container is felt along with the motion of the hand. In addition, everyone has an experience that in a case where the object in the container is shaken, the haptic feedback that appears when the object attacks an inner wall of the container is changed depending on the amount of the object, i.e., a large amount or a small amount.

In other words, even if a human does not view the object in the container, the human can intuitively understand an analog amount of the object in the container by holding and moving the container by a hand and feeling an analog vibration as haptically along with the vibration of the object in the container. The reason is that, after the object in the container is shaken, the waveforms of the vibration generated by the object impinging on the inner wall of the container 30 are different when the amount of the object is small and when the amount of the object is large.

In this embodiment, the waveform expressing the motions of the objects in the containers when the objects in the amounts corresponding to the electronic information showing an amount are placed in the same containers and the containers are moved in a similar manner is simulated in advance. The "objects in the amount corresponding to the electronic information showing an amount" means that there is a correlation (for example, proportion) between the amount shown by the electronic information and the amount of the object such that if the amount shown by the electronic information is small, the amount of the object is also small, and if the amount shown by the electronic information is large, the amount of the object is also large.

Note that the replacement shown in FIG. 6 can also be said that the electronic information is virtually replaced with the motion of the object. In other words, it can also be said that the electronic information that cannot be touched by a human is virtually replaced with the motion of the object that can be touched by a human. For example, the remaining battery charge is virtually replaced with the motion of the liquid 31 in the container 30 when the liquid 31 is placed in the container 30 and the container 30 is moved. In addition, the electronic money balance can be virtually replaced with the motion of the coins 41 in the container 40 that appears when the coins 41 are placed in the container 40 and the container 40 is moved. The waveform that expresses the replaced motion is generated and the housing 2 or the like vibrates. Thus, the user feels an analog vibration as the haptic feedback and can intuitively understand the electronic information (information showing amount).

Furthermore, according to this embodiment, the information selection unit 102 selects the type of information to be presented in response to the different motions of the information processing apparatus 1. More specifically, the information selection unit 102 selects the remaining battery charge when a user lifts the information processing apparatus 1 and selects the electronic money balance when the user shakes the information processing apparatus 1. Thus, the user does not need to view the screen for operating the touch panel 3 or the like in order to select the information to be presented. Accordingly, even if the user has anxious about eyesight, for example, the type of information to be presented can be selected with no problem. Also, it can avoid a risk of walking while viewing the screen of the smartphone or the like.

Furthermore, the selection of the type of information and the presentation of the information are completed by the user's action ("shake" or the like) and the haptic feedback. Thus, the user does never need to view the screen for operating the touch panel 3 or the like and can intuitively and momentarily select the type of information and recognize the information.

Second Embodiment

In the following description, configurations, actions, and the like similar to the configurations, the actions, and the like already described are denoted by the same or similar reference numerals, and thus detailed description thereof will be hereinafter omitted. Mainly, only different points will be described.

The different point between the first embodiment and a second embodiment is a method of selecting the type of information to be presented by the information selection unit 102. In the first embodiment, the information selection unit 102 selects the type of information to be presented in response to the different motions (lift, shake) of the information processing apparatus 1. In contrast, in the second embodiment, the information selection unit 102 selects the type of information to be presented in response to different combinations of the motions (lift, shake, or the like) of the information processing apparatus 1.

FIG. 7 is a table schematically showing a relationship between the different combinations of the motions of the information processing apparatus and the types of information to be presented in the second embodiment.

The table (library) showing the relationship between the different combinations of the motions of the information processing apparatus and the types of information to be presented is stored in the memory unit 16 in advance. The information selection unit 102 refers to the library and selects the type of information to be presented.

Figure 8:
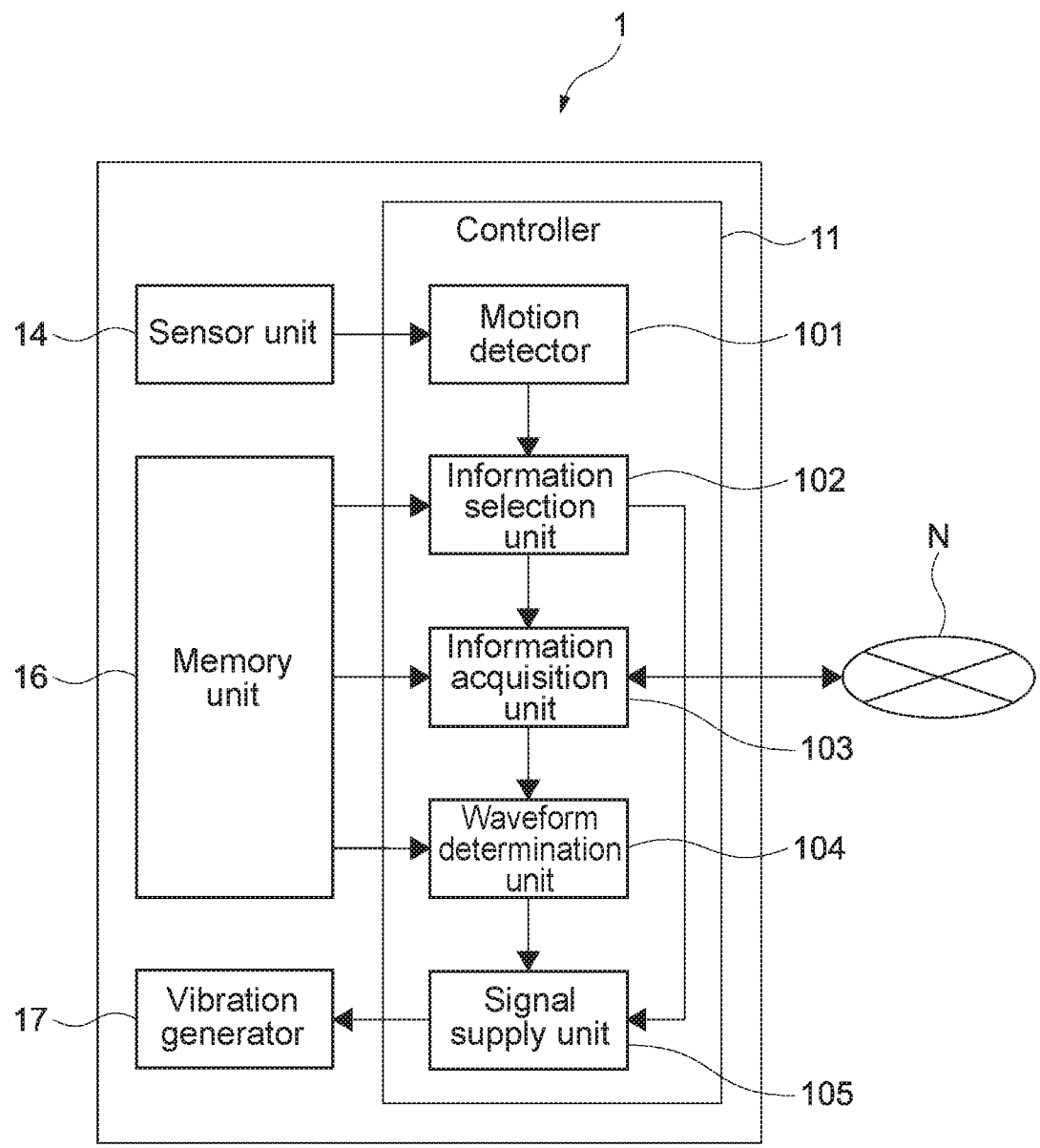
FIG. 8 is a block diagram showing a functional configuration example of the information processing apparatus.
Figure 9:
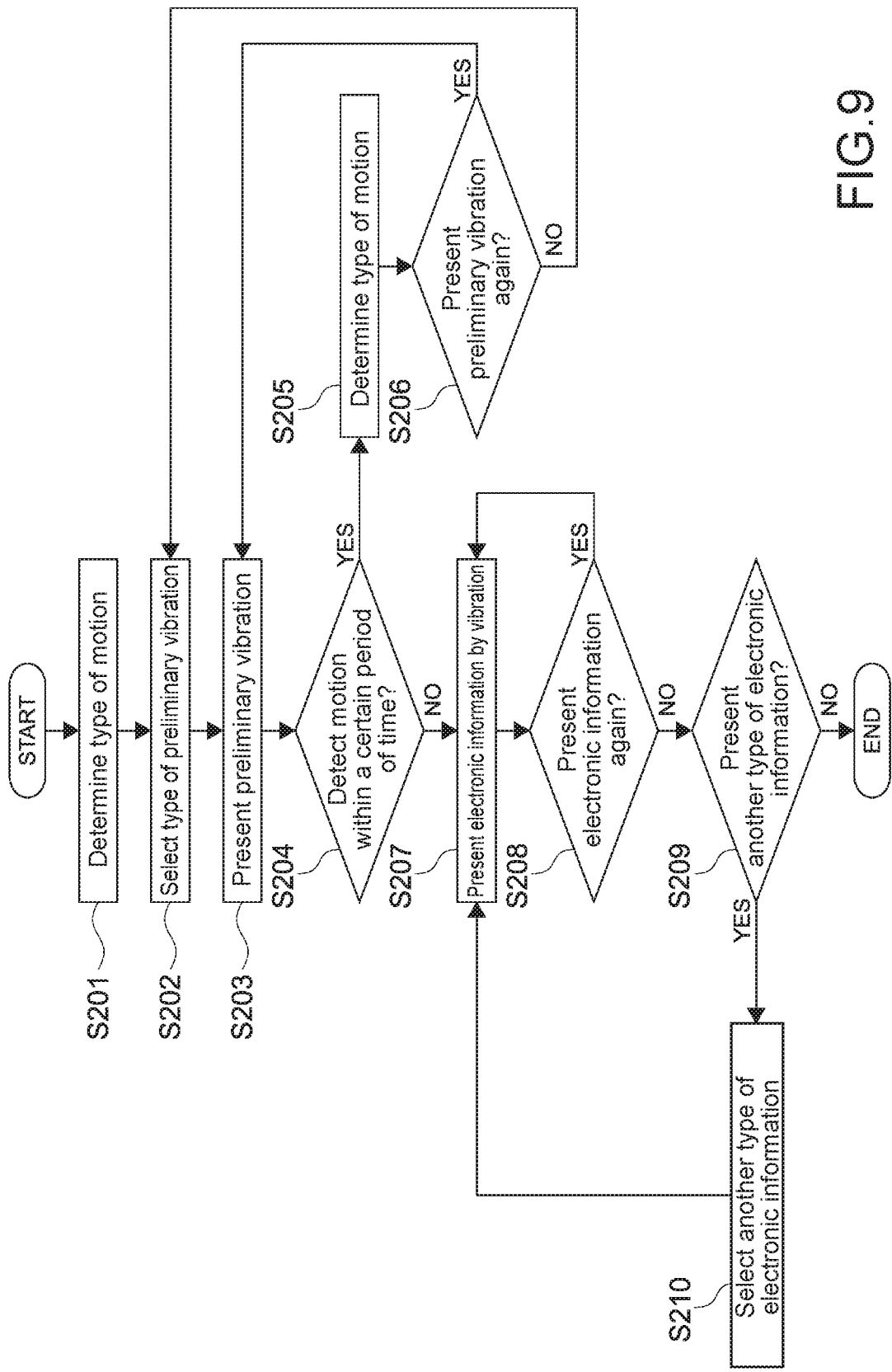
FIG. 9 is a flowchart showing a process flow of the information processing apparatus.

FIG. 8 is a block diagram showing a functional configuration example of the information processing apparatus. FIG. 9 is a flowchart showing a process flow of the information processing apparatus.

The information selection unit 102 acquires the information about the motions of the information processing apparatus 1, i.e., the information about the direction of movement and the speed from the motion detector 101. The information selection unit 102 determines the types of the motions of the information processing apparatus 1, i.e., any of lift, shake, and lift from a horizontal state (Step S201). The "lift" and the "shake" are determined in the same manner as those in the first embodiment. The "horizontal state" can be determined on the basis of the information acquired from the gyro sensor of the sensor unit 14.

The information selection unit 102 refers the library preliminary stored in the memory unit 16 and selects a preliminary vibration corresponding to the type of the motion determined (Step S202). The "preliminary vibration" is a vibration correlated with the type of information to be presented and is defined in the library along with the types of the user's different motions. In this embodiment, the preliminary vibration "once" is correlated with the remaining battery charge, and the preliminary vibration "twice" is correlated with the electronic money balance. In addition, the preliminary vibration "three times" is correlated with a rainfall amount in weather.

The user understands the information defined in the library in advance, and can grasp the types of information to be presented on the basis of the number of times of the preliminary vibration. In other words, the "preliminary vibration" will be the haptic feedback for confirming the type of information to be presented with the user.

Note that, in this embodiment, in a case where the "lift" is determined as the first action, the preliminary vibration "once" is selected. In a case where the "shake" is determined as the first action, the preliminary vibration "twice" is selected. In addition, in a case where the "lift from a horizontal state" is determined as the first action, the preliminary vibration "three times" is selected. By the number of times of the "preliminary vibration", it also becomes possible to determine whether or not own motion is inputted properly. In other words, it is also possible to allow function the "preliminary vibration" as the haptic feedback for confirming the user with the type of the motion determined by the information selection unit 102.

The information selection unit 102 issues a command to the signal supply unit 105 such that a drive signal for performing the selected preliminary vibration is supplied to the vibration generator 17. The signal supply unit 105 supplies the vibration generator 17 with the drive signal for performing the selected preliminary vibration (Step S203). The vibration generator 17 performs the preliminary vibration on the basis of the drive signal.

In a case where the information selection unit 102 acquires the information about the motion of the information processing apparatus 1 from the motion detector 101 within a certain period of time thereafter (YES in Step S204), the information selection unit 102 determines the type of the motion (Step S205). The information selection unit 102 determines the type of the motion as the motion that the user instructs to present the preliminary vibration again (for example, motions other than the "shake" such as "hitting" and "rotation") or as the motion for selecting the information to be presented (in this embodiment "shake") (Step S206).

In a case where the information selection unit 102 determines that the motion instructs presentation of the preliminary vibration again (YES in Step S206), the information selection unit 102 issues the command to the signal supply unit 105 such that the drive signal for performing the same number of times of the preliminary vibration is supplied to the vibration generator 17 (Step S203). On the other hand, in a case where the information selection unit 102 determines that the motion is for selecting the information to be presented ("shake") (NO in Step S206), the information selection unit 102 selects the preliminary action correlated with other information to be presented (Step 202). For example, a preliminary action of the number of times obtained by adding one to the previous preliminary action is selected.

Thus, in a case where the user determines that the number of times of the preliminary vibrations is not the number of times correlated with the type of information that the user desires (for example, the user desires the "electronic money balance" correlated with the preliminary vibration "twice", but the preliminary vibration is "once"), it becomes possible to move (shake) the information processing apparatus 1 again to select the type of information. By moving the information processing apparatus 1 until the number of times of the preliminary action correlated with the type of information that the user desires is realized, it becomes possible to easily select the information to be presented.

The information selection unit 102 repeats Steps S201 to S206 and determines the type of information to be presented in a case where the information about the motion of the information processing apparatus 1 is not acquired from the motion detector 101 (NO in Step S204). In other words, detection of the motion of the information processing apparatus 1 and the preliminary vibration are repeated. The type of information correlated with the number of times of the preliminary vibration finally presented is determined as the type of information to be presented. Also, as shown in FIG. 7, in this embodiment, the combinations of the detected motion and the preliminary vibration and the types of information to be presented are defined as follows:

(1) In a case where a first motion is the "lift", a next motion is a first preliminary vibration "once", and there is no next motion, the remaining battery charge is selected.

(2) In a case where the first motion is the "lift", the next motion is the first preliminary vibration "once", a second motion is the "shake", the next motion is a second preliminary vibration "twice", and there is no next motion, the electronic money balance is selected.

(3) In a case where the first motion is the "shake", the next motion is the first preliminary vibration "twice", and there is no next motion, the electronic money balance is selected.

(4) In a case where the first motion is the "shake", the next motion is the first preliminary vibration "twice", the next motion is the second motion "shake", the next motion is the second preliminary vibration "three times", and there is no next motion, the rainfall amount in (weather) is selected.

(5) In a case where the first motion is the "shake", the next motion is the first preliminary vibration "twice", the next motion is the second motion "shake", the next motion is the second preliminary vibration "three times", the next motion is a third motion "shake", the next motion is a third preliminary vibration "once", and there is no motion, the remaining battery charge is selected.

(6) In a case where the first motion is the "lift from a horizontal state", the next motion is the first preliminary vibration "three times", and there is no motion, the rainfall amount in (weather) is selected.

The information selection unit 102 notifies the information acquisition unit 103 of the types of information (remaining battery charge, electronic money balance, and rainfall amount in weather) determined by repeating Steps S201 to S206.

Note that the haptic feedback presented by the preliminary vibration corresponds to the haptic feedback corresponding to the selected electronic type. In addition, the drive signal outputted to execute the preliminary vibration corresponds to a second haptic vibration.

The information acquisition unit 103 receives a notification about the type of information to be presented (remaining battery charge, electronic money balance, and rainfall amount in weather) from the information selection unit 102. The information acquisition unit 103 acquires the notified type of information (electronic information). In a case where the rainfall amount in weather is notified, the information acquisition unit 103 acquires the electronic information showing the rainfall amount of a predetermined area (present location, target location, or the like) at a predetermined time (current or future) from the memory unit 16 or a server device (not shown) through a network N. The information acquisition unit 103 supplies the waveform determination unit 104 with the acquired information (remaining battery charge, electronic money balance, rainfall amount in weather).

The waveform determination unit 104 acquires the electronic information (remaining battery charge, rainfall amount in weather) from the information acquisition unit 103. The waveform determination unit 104 reads out the waveform information correlated with the electronic information acquired from the information acquisition unit 103 from the memory unit 16. The waveform determination unit 104 supplies the signal supply unit 105 with the waveform information read out from the memory unit 16. The signal supply unit 105 acquires the waveform information from the waveform determination unit 104. The signal supply unit 105 supplies the vibration generator 17 with the drive signal for vibrating the contact object with this waveform (Step S207).

For example, the "haptic feedback with respect to the object" that the rainfall amount information in weather is virtually replaced may be the motion of liquid in the container that appears when the liquid in the amount corresponding to the rainfall amount is placed in the container and the container is moved similar to the case of the remaining battery charge. Alternatively, the haptic feedback that feels as if raindrops fall on a palm in an amount corresponding to the rainfall amount, i.e., the haptic feedback that feels as if the hand is locally and continuously pressed, may be presented.

Thereafter, in a case where the information selection unit 102 acquires the information about the motion from the motion detector 101 within a certain period of time and determines that the motion instructs the presentation again (for example, motions other than the "shake" e.g., "hit", "rotate", or the like) (YES in Step S208), the information selection unit 102 instructs again the signal supply unit 105 to supply the vibration generator 17 with the drive signal (Step S207). On the other hand, in a case where the information selection unit 102 determines that the information about the motion acquired from the motion detector 101 is the motion that instructs to present another type of information (for example, "shake") (YES in Step S208, No in Step S209), another type of information is selected (Step S210). For example, in a case where the remaining battery charge is selected, the electronic money balance is selected as another type of information. The contact object vibrates again and the electronic money balance is presented (Step S207).

According to the second embodiment, the effects similar to those described in the first embodiment are provided. Moreover, since the information selection unit 102 can select the type of electronic information in response to the different combinations of the motions of the information processing apparatus 1, it also becomes possible to select a number of the types of information by the combinations of simple actions for the user.

Third Embodiment

The different point between the first embodiment and a third embodiment is a method of determining the waveform by the waveform determination unit 104. In the first embodiment, the waveform determination unit 104 reads out the waveform information from the memory unit 16. In contrast, in the third embodiment, the waveform determination unit 104 generates the waveform on the basis of the waveform information read out from the memory unit 16 and the motion of the information processing apparatus 1 acquired by the motion detector 101.

Figure 10:
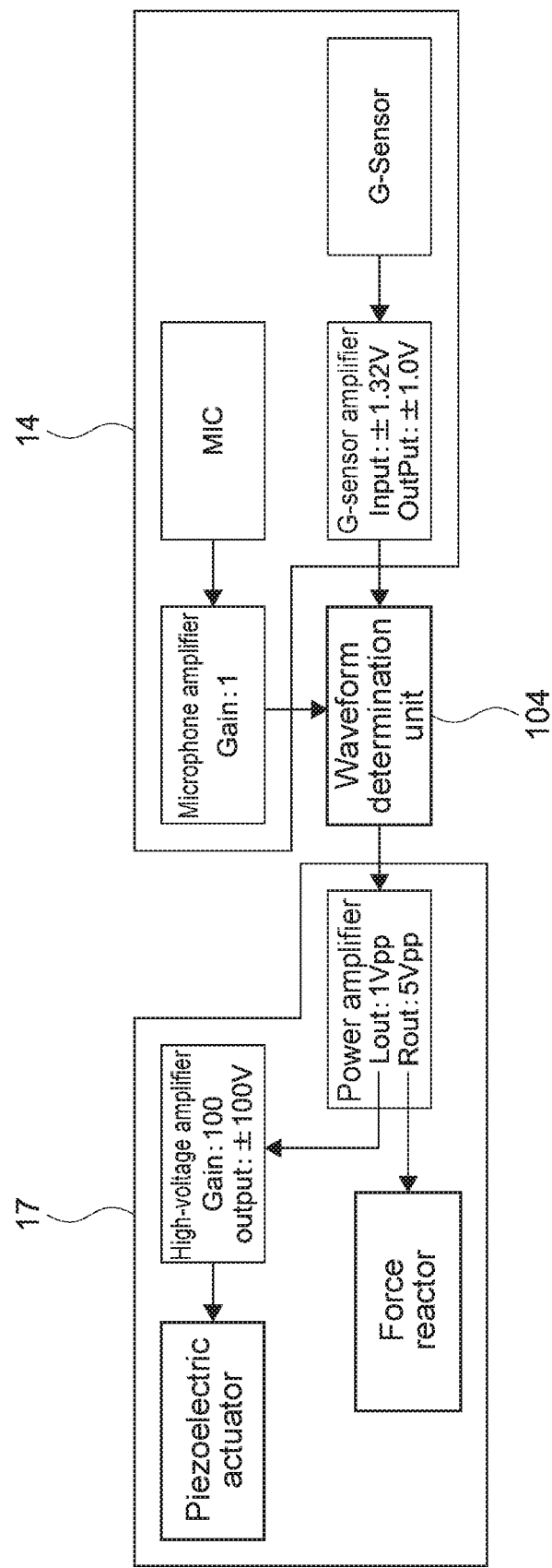
FIG. 10 is a diagram showing an electrical configuration for generating a waveform by a waveform determination unit in a third embodiment.

FIG. 10 is a diagram showing an electrical configuration for generating the waveform by the waveform determination unit 104 in the third embodiment.

The acceleration sensor (G-sensor) of the sensor unit 14 detects the vibration of the information processing apparatus 1 and outputs a detection signal to the acceleration sensor amplifier. The acceleration sensor amplifier amplifies the detection signal inputted from the acceleration sensor and outputs to the waveform determination unit 104. A microphone (MIC) detects the vibration of the information processing apparatus 1 and outputs the detection signal to a microphone amplifier. The microphone amplifier amplifies the detection signal inputted from the microphone and outputs to the waveform determination unit 104.

The waveform determination unit 104 reads out the waveform information from the memory unit 16. The waveform information is for presenting the haptic feedback acquired by replacing the electronic information with the "haptic feedback with respect to the object". On the basis of the waveform, the waveform determination unit 104 generates a waveform that follows the vibration (motion) of the information processing apparatus 1 acquired from the sensor unit 14.

The "waveform that follows the vibration (motion)" will be described. With reference to FIG. 6, the description is made by illustrating the motion of the liquid 31 in the container 30 when the liquid 31 that replaces the remaining battery charge information is placed in the container 30 and the container 30 is moved. In a case where the container 30 that contains the liquid 31 is moved by a hand, a shake of the liquid 31 in the container 30 is felt along with the motion of the hand. Everyone has an experience that in a case where the liquid in the container 30 is shaken, the haptic feedback that appears when the liquid 31 attacks an inner wall of the container 30 is different when the container 30 is strongly moved and when the container 30 is weakly moved. The reason is that, after the liquid 31 in the container 30 is shaken, the waveforms of the vibration generated by the liquid 31 impinging on the inner wall of the container 30 are different when the container 30 is strongly moved and when the container 30 is weakly moved.

Thus, in this embodiment, the waveform expressing the motions of the liquids 31 in the containers 30 when the liquids 31 in the amounts corresponding to the remaining battery charge are placed in the same containers 30 and the containers 30 are moved is simulated by following an amount of the motions and directions of the containers 30. In other words, moving the information processing apparatus 1 by holding by a user's hand is regarded as moving the container 30 that contains the liquid 31 by the hand. When the user moves the information processing apparatus 1, the waveform is simulated in a real time by following the motions.

Specifically, for example, in a case where the user strongly shakes the information processing apparatus 1, a random vibration waveform having large amplitude is generated such that the liquid 31 strongly hits on a wall surface of the container 30 and bounces back in many times. For example, in a case where the user weakly shakes the information processing apparatus 1, a ripple-like vibration waveform having small amplitude is generated such that the liquid 31 weakly hits on the wall surface of the container 30 and immediately converges.

In addition, in order to vibrate a variety of parts of the information processing apparatus 1, one or more piezoelectric actuators and/or one or more Force reactors shown in FIG. 10 are provided at one or more appropriate positions. As a result, it realizes the vibration that follows a tilt of the information processing apparatus 1. For example, in a case where the user tilts the information processing apparatus 1, the liquid 31 flows in a tilted direction, and it realizes the vibration such that the liquid 31 strongly hits on the wall surface of the container and bounces back at an end.

As described above, the waveform determination unit 104 generates the waveform that follows the motion of the information processing apparatus 1 on the basis of the waveform that appears when the electronic information is replaced with the "haptic feedback with respect to the object". Thus, according to the third embodiment, the haptic acquired by the user is closer to the haptic (haptic feedback) acquired from a real object motion as compared with the first embodiment. Accordingly, the user feels an analog vibration closer to reality as the haptic feedback and can more intuitively understand the electronic information (information showing amount).

Fourth Embodiment

In the first embodiment, one information processing apparatus 1 detects the motion of the information processing apparatus 1 and vibrates. In contrast, in a fourth embodiment, there are two information processing apparatuses intercommunicable via a network. In a case where one information processing apparatus detects a motion of own apparatus, the other information processing apparatus vibrates.

Figure 11:
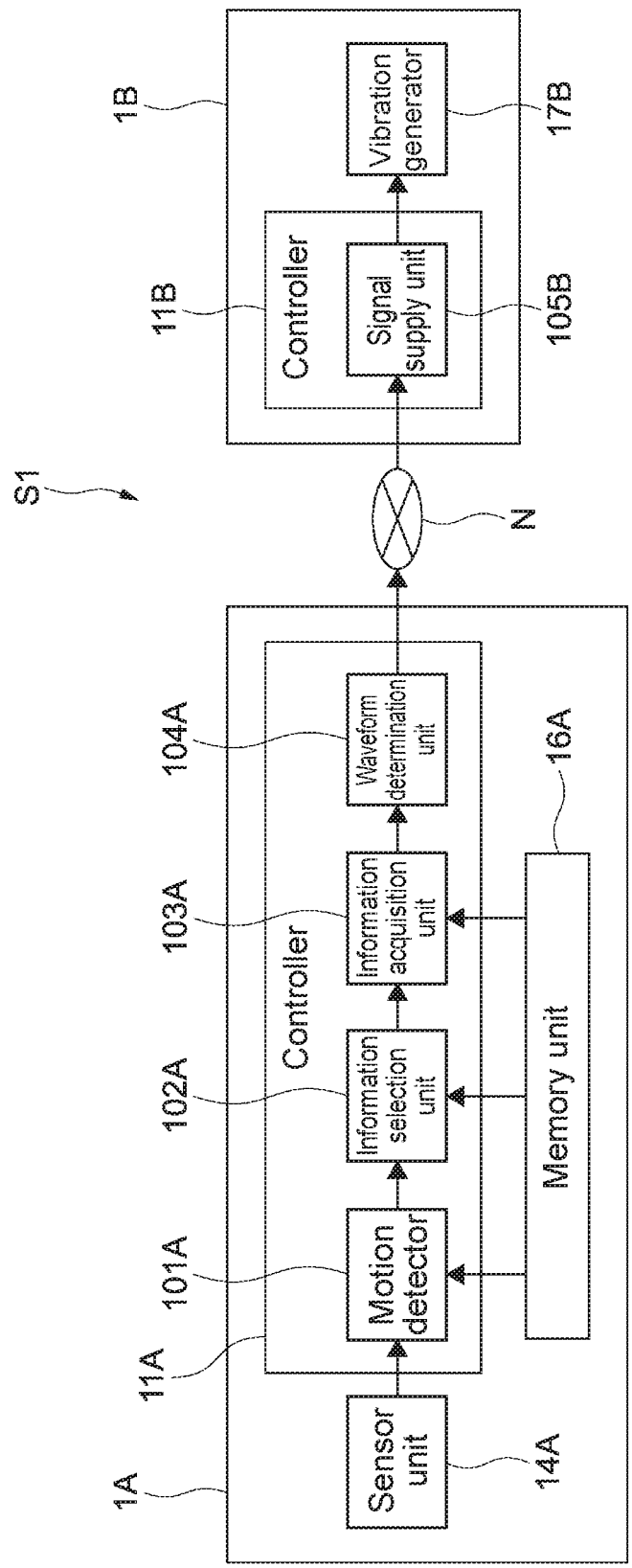
FIG. 11 is a diagram showing a functional configuration example of an information processing system in a fourth embodiment.

FIG. 11 is a diagram showing a functional configuration example of an information processing apparatuses in the fourth embodiment.

An information processing system S1 includes a first information processing apparatus 1A and a second information processing apparatus 1B. The first information processing apparatus 1A and the second information processing apparatus 1B are intercommunicable via a network N, e.g., the Internet.

The first information processing apparatus 1A at least includes a sensor unit 14A, a motion detector 101A, an information selection unit 102A, an information acquisition unit 103A, and a waveform determination unit 104A of a controller 11A.

The second information processing apparatus 1B at least includes a signal supply unit 105B of a controller 11B and a vibration generator 17B. The second information processing apparatus 1B having this configuration may not be a mobile information terminal, e.g., a smartphone but be a device mainly having a vibration function.

In the first information processing apparatus 1A, the motion detector 101A detects the motion of the first information processing apparatus 1A on the basis of the direction of movement and the speed of the first information processing apparatus 1A detected at least by the acceleration sensor of the sensor unit 14A. The information selection unit 102A selects the type of information to be presented in response to the different motions of the first information processing apparatus 1A. The information acquisition unit 103A acquires electronic information to be presented. The waveform determination unit 104A determines the waveform for presenting the "haptic feedback with respect to the object" when the electronic information is virtually replaced with the "haptic feedback with respect to the object". The first information processing apparatus 1A supplies the second information processing apparatus 1B with the waveform determined by the waveform determination unit 104A via the network N.

The second information processing apparatus 1B acquires the waveform from the first information processing apparatus 1A via the network N. The signal supply unit 105B supplies the vibration generator 17B with the drive signal for vibrating the contact object (at least part of housing and/or touch panel of information processing apparatus 1B) with the waveform acquired from the first information processing apparatus 1A. The vibration generator 17B vibrates on the basis of the inputted drive signal and makes the contact object to vibrate.

As described above, one first information processing apparatus 1A and one second information processing apparatus 1B are described but are not limited thereto. The information processing system S1 may include one first information processing apparatus 1A and a plurality of second information processing apparatuses 1B. Thus, in a case where one first information processing apparatus 1A detects the motion of own apparatus, the plurality of second information processing apparatuses 1B vibrates. Alternatively, the information processing system S1 may include a plurality of first information processing apparatuses 1A and one second information processing apparatus 1B. Thus, in a case where each of the plurality of first information processing apparatuses 1A respectively detects the motions of own apparatuses, one second information processing apparatus 1B vibrates. Alternatively, the information processing system S1 may include the plurality of first information processing apparatuses 1A and the plurality of second information processing apparatuses 1B (any of which is not shown).

Fifth Embodiment

In the fourth embodiment, there are two information processing apparatuses intercommunicable via the network. One information processing apparatus can detect the motion of own apparatus but cannot vibrate, and the other information processing apparatus can vibrate but cannot detect the motion of own apparatus. In contrast, in a fifth embodiment, both the two information processing apparatuses intercommunicable via the network can detect the motions of own apparatuses and vibrate.

Figure 12:
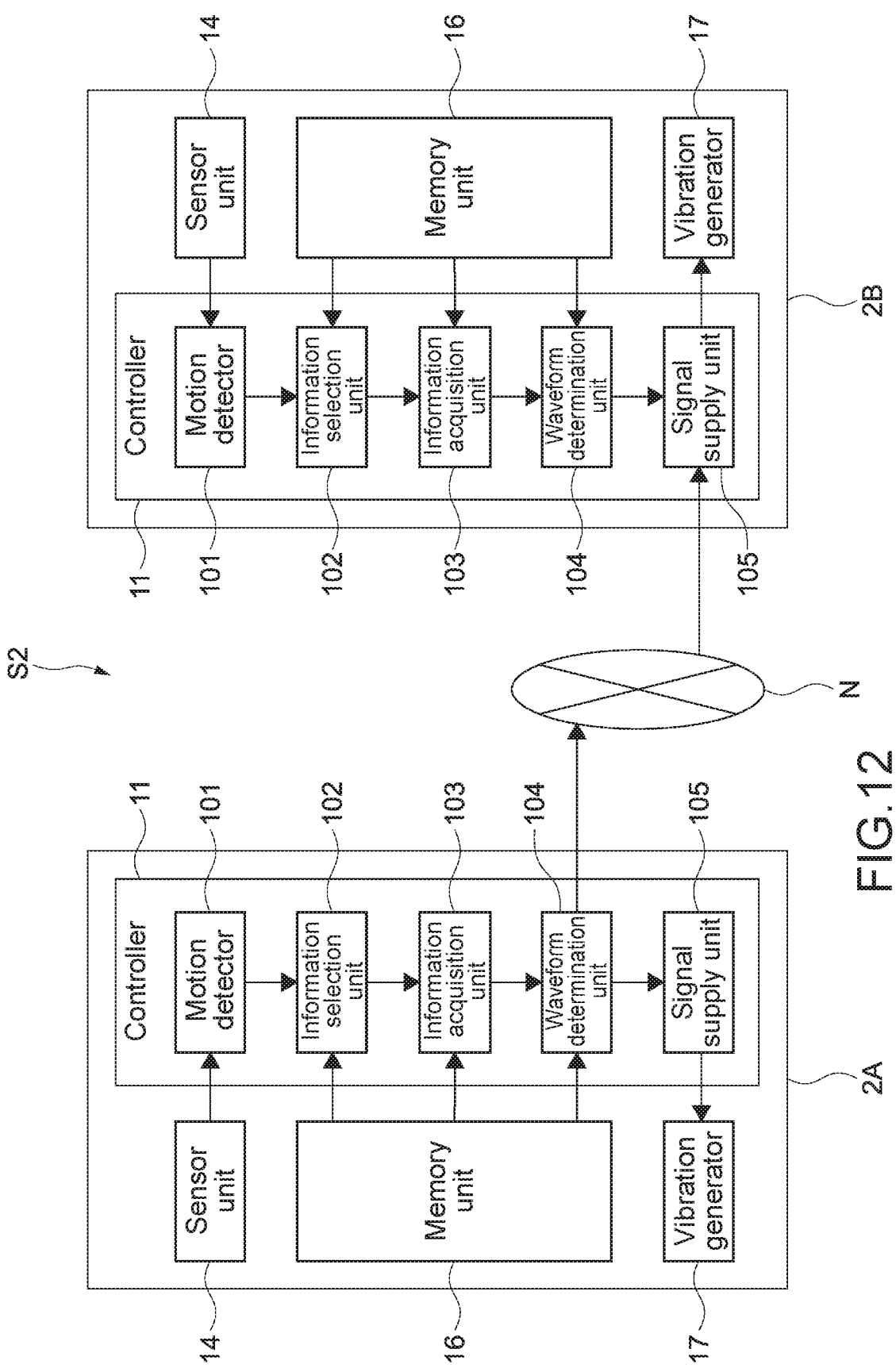
FIG. 12 is a diagram showing a functional configuration example of an information processing system in a fifth embodiment.

FIG. 12 is a diagram showing a functional configuration example of an information processing system in the fifth embodiment.

An information processing system S2 includes a first information processing apparatus 2A and a second information processing apparatus 2B. The first information processing apparatus 2A and the second information processing apparatus 2B are intercommunicable via the network N, e.g., the Internet.

Each of the first information processing apparatus 2A and the second information processing apparatus 2B includes the sensor unit 14, the motion detector 101, the information selection unit 102, the information acquisition unit 103, the waveform determination unit 104, the signal supply unit 105 of the controller 11, and the vibration generator 17.

In the first information processing apparatus 2A, the motion detector 101 detects a motion of the first information processing apparatus 2A on the basis of the direction of movement and the speed of the first information processing apparatus 2A detected by at least the acceleration sensor of the sensor unit 14. The information selection unit 102 selects the type of information to be presented in response to the different motions of the first information processing apparatus 2A. The information acquisition unit 103 acquires the electronic information to be presented. The waveform determination unit 104 determines the waveform for presenting the "haptic feedback with respect to the object" when the electronic information is replaced with the "haptic feedback with respect to the object". The first information processing apparatus 2A supplies the second information processing apparatus 2B with the waveform determined by the waveform determination unit 104 via the network N.

The second information processing apparatus 2B acquires the waveform from the first information processing apparatus 2A via the network N. The signal supply unit 105 supplies the vibration generator 17 with the drive signal for vibrating the contact object (at least part of housing and/or touch panel of information processing apparatus 1B) with the waveform acquired from the first information processing apparatus 2A. The vibration generator 17B vibrates on the basis of the inputted drive signal and makes the contact object to vibrate.

[Modification of Fifth Embodiment]

As described above, the two information processing apparatuses 2A and 2B are described but are not limited thereto. The information processing system S2 may include three or more information processing apparatuses (not shown). Thus, in a case where one or the plurality of first information processing apparatuses detect the motions of own apparatuses, the other or the plurality of information processing apparatuses vibrate.

As described above, the waveform determined by the waveform determination unit 104 of the first information processing apparatus 2A is supplied to the second information processing apparatus 2B. Alternatively, the information acquisition unit 103 of the first information processing apparatus 2A supplies the second information processing apparatus 2B with the electronic information and the waveform determination unit 104 of the second information processing apparatus 2B may determine the waveform.

<Modification>

The embodiments according to the present technology are not limited to the above-described embodiments and may be variously modified.

The electronic money balance or the like is presented by using as a trigger the specific motion (shake) of the information processing apparatus in the first embodiment and by using as a trigger a specific combination of the motions of the information processing apparatuses in the second embodiment. Alternatively, for example, the information processing apparatus may have a GPS (Global Positioning System) sensor and may present the electronic money balance or the like by using as a trigger an approach of the information processing apparatus around a station ticket gate. Alternatively, the electronic money balance or the like may be presented by using as a trigger the specific motion (shake) of the information processing apparatus around a station ticket gate. Alternatively, the electronic information may be presented by using a trigger a depression of a physical button of the information processing apparatus 1.

In each embodiment, the contact object is allowed to vibrate with the waveform for presenting the "haptic feedback with respect to the object" when the electronic information (information showing an amount; specifically remaining battery charge, electronic money balance, and rainfall amount in weather) is replaced with the "haptic feedback with respect to the object". Alternatively, as the electronic information, the following specific examples (1) to (5) may be used and the contact object may be allowed to vibrate with the waveform for presenting the "haptic feedback with respect to the object" when the electronic information in each example is replaced with the "haptic feedback with respect to the object". The electronic information may not show an amount.

(1) Time

The information processing apparatus detects an action of, for example, touching the information processing apparatus (as it is not shaken, the information processing apparatus may be kept in a pocket, etc.) with the acceleration sensor. The information processing apparatus reads out time information and allows the vibration generator to vibrate with the vibration waveform set in response to the current time.

(2) Home Information

The information processing apparatus detects the current position within a home with a WiFi strength of a home network and detects the motion (shake) of the information processing apparatus with the acceleration sensor. The information processing apparatus notifies the server device in the home of the detected current position and the motion via a home network. The server device receives and uses the notification as a trigger to read out the electronic information (forgot to lock door, electric power usage state, or the like) from own apparatus or acquire from other devices via the home network. The server device determines the vibration waveform set in response to the acquired electronic information and supplies the vibration waveform to the information processing apparatus via the home network. The information processing apparatus allows the vibration generator to vibrate with the vibration waveform acquired from the server device via the home network.

Alternatively, the server device supplies the information processing apparatus with the acquired electronic information via the home network. The information processing apparatus acquires the electronic information from the server device via the home network. The information processing apparatus determines the vibration waveform set in response to the acquired electronic information and allows the vibration generator to vibrate with the determined vibration waveform.

(3) Pet Activities

The acceleration sensor is attached to a pet in the home in advance. The server device in the home stores the motion of the pet detected by the acceleration sensor attached to the pet. The information processing apparatus detects the motion (shake) of the information processing apparatus by the acceleration sensor. Once the motion is detected, the information processing apparatus notifies the server device in the home via the home network. Receiving the notification, the server reads out the electronic information (motion of pet) using the notification as a trigger, determines the vibration waveform set in response to the acquired electronic information, and supplies to the information processing apparatus via the home network. The information processing apparatus allows the vibration generator to vibrate with the vibration waveform acquired from the server device via the home network.

Alternatively, the server device supplies the acquired electronic information to the information processing apparatus via the home network. The information processing apparatus acquires the electronic information from the server device via the home network. The information processing apparatus determines the vibration waveform set in response to the acquired electronic information and allows the vibration generator to vibrate with the determined vibration waveform.

Alternatively, the server device is not interposed, the first information processing apparatus may be used as a small-sized information processing apparatus (including acceleration sensor) attached to the pet, and the second information processing apparatus may be used as a mobile information terminal that the user holds in the information processing system according to the fourth embodiment.

(4) Partner's (Other Person's) Activities

A partner (other person) wears a wearable terminal (including pulse sensor). The user includes the information processing apparatus. The information processing apparatus detects the motion (shake) of the information processing apparatus by the acceleration sensor. The information processing apparatus notifies the wearable terminal of the detected motion via the network. The wearable terminal receives the notification and supplies the information processing apparatus with the electronic information (pulse recorded data) via the network. The information processing apparatus acquires the pulse recorded data via the network. The information processing apparatus determines the vibration waveform set in response to the acquired electronic information and allows the vibration generator to vibrate with the determined vibration waveform. According to this embodiment, for example, in a case where a wearable terminal (including pulse sensor) is attached to an aged person and a family who live apart, care workers, medical personals, and the like hold the information processing apparatus, the user of the information processing apparatus can grasp an activity condition and a health condition of the aged person.

Alternatively, the server device (in the home or in the Internet) may be interposed. In other words, the electronic information (pulse recorded data) detected by the wearable terminal is stored in the server device and the server device may supply the information processing apparatus with the electronic information (pulse recorded data) via the network. Alternatively, the server device may determine the vibration waveform on the basis of the electronic information (pulse recorded data) and supply the information processing apparatus with the vibration waveform via the network.

(5) Information about Refrigerator Content (Food Stuff Leftovers)

It assumes that the user holds the information processing apparatus (including GPS sensor) and is at the food section or the like. The information processing apparatus detects the current position by the GPS sensor and the motion (shake) of the information processing apparatus is detected by the acceleration sensor. The information processing apparatus acquires information about a selling section at the detected current position via the Internet. Once the information processing apparatus acquires a "food section" as the information about the selling section, the information processing apparatus notifies the information processing apparatus mounted to a refrigerator in the home of the detection of the motion via the Internet. The information processing apparatus mounted to the refrigerator measures a weight of contents (food stuff leftovers) in the refrigerator and acquires the electronic information (weight of food stuff leftovers). The information processing apparatus mounted to the refrigerator supplies the information processing apparatus held by the user with the acquired electronic information (weight of food stuff leftovers) via the Internet. The information processing apparatus held by the user determines the vibration waveform set in response to the acquired electronic information and allows the vibration generator to vibrate with the determined vibration waveform.

Alternatively, the server device (in the home or in the Internet) may be interposed. In other words, the electronic information (weight of food stuff leftovers) detected by the information processing apparatus mounted to the refrigerator may be stored in the server device and the server device may supply the information processing apparatus held by the user with the electronic information (weight of food stuff leftovers) via the network. Alternatively, the server device may determine the vibration waveform on the basis of the electronic information (weight of food stuff leftovers) and may supply the information processing apparatus held by the user with the vibration waveform via the network.

A type of the "haptic feedback with respect to the object" corresponding to the electronic information is not limited. For example, by changing a temperature, a shape, hardness, or the like of the information processing apparatus, it is also possible to present the haptic feedback. For example, in response to the information about the temperature, e.g., an air temperature, the temperature of the information processing apparatus may be controlled. Alternatively, in response to geographic features, geological features, or the like of a user's standing point, the shape or the hardness of the information processing apparatus may be controlled.

The temperature can be controlled by using a heat source, e.g., a heater, included in the information processing apparatus, for example. Alternatively, it is also possible to control the temperature by controlling an action of a cooling mechanism including a fan device or the like.

The shape of the information processing apparatus can be controlled by providing a housing or the like of the control device with a shape memory alloy, a wire, or the like, for example. The hardness of the control device can be controlled by controlling a support mechanism included inside, for example. Alternatively, a material that can control the hardness may be used.

Thus, the "haptic" feeling presented by the present technology includes not only the haptic feedback but also the heat (temperature) felt from the object, the recognized shape, the hardness, or the like (it can be also said that shape and hardness may be feeling based on the "haptic feedback"). In other words, the "haptic feedback" according to the present technology includes a variety of feeling felt via contact. Also, illusionary feeling haptic feedback such as pseudo haptic feedback, virtual haptic feedback, illusive haptic feedback, and the like may be included.

In the above description, the information processing method according to the present technology is executed by a computer, e.g., a mobile terminal, operated by the user. However, the information processing method and the program according to the present technology may be executed by using another computer communicable with the computer operated by the user via the network, or the like. Also, the computer operated by the user may be linked to other computer, to thereby constructing the information processing system according to the present technology.

In other words, the information processing method and the program according to the present technology can be executed not only by a computer system including a single computer but also by a computer system including a plurality of computers that are linked and operated. Note that, in the present disclosure, a system means a set of a plurality of components (device, module (parts), or the like) and it is not a matter whether or not all components are present within the same housing. Accordingly, both of a plurality of devices housed in separated housings and connected via a network and one device including a plurality of modules housed in one housing are systems.

The information processing method and the program according to the present technology are executed by the computer system. For example, both cases are included: acquiring the electronic information and outputting a first haptic signal are executed by a single computer, and each processing is executed by different computers. In addition, executing each processing by a predetermined computer includes executing a part or all of the processing by other computer and acquiring the result.

Specifically, the information processing method and the program according to the present technology can be applied to a cloud computing configuration such that one function is shared and co-processed by a plurality of devices via a network.

The present technology may also have the following structures.

(1) An information processing apparatus, including: an information acquisition unit that acquires electronic information; and a signal output unit that outputs a first haptic signal for presenting haptic feedback with respect to an object, the haptic feedback with respect to the object being set corresponding to the acquired electronic information.

(2) The information processing apparatus according to (1), in which the haptic feedback with respect to the object includes haptic feedback with respect to a container that contains the object corresponding to the acquired electronic information.

(3) The information processing apparatus according to (2), in which the electronic information includes a type of information and an amount, and the haptic feedback with respect to the object includes haptic feedback that appears when the container that contains the object corresponding to the type of information of an amount corresponding to the amount is moved.

(4) The information processing apparatus according to (3), further including:

a motion detector that detects a motion of the information processing apparatus, in which the signal output unit outputs the first haptic signal for presenting the haptic feedback that appears when the container is moved on the basis of the detected motion of the information processing apparatus.

(5) The information processing apparatus according to (3) or (4), in which the electronic information includes a remaining battery charge, and the haptic feedback with respect to the object includes haptic feedback that appears when the container that contains liquid of an amount corresponding to the remaining battery charge is moved.

(6) The information processing apparatus according to any one of (3) to (5), in which the electronic information includes an electronic money balance, and the haptic feedback with respect to the object includes haptic feedback that appears when the container that contains coins of an amount corresponding to the electronic money balance is moved.

(7) The information processing apparatus according to any one of (1) to (6), in which the signal output unit outputs, as the first haptic information, a drive signal for driving a haptic feedback presentation unit that presents the haptic feedback with respect to the object by a vibration.

(8) The information processing apparatus according to any one of (1) to (7), further including:

a motion detector that detects a motion of the information processing apparatus, in which the information acquisition unit acquires the electronic information in a case where a predetermined motion of the information processing apparatus is detected.

(9) The information processing apparatus according to (8), further including:
an information selection unit that selects a type of the electronic information acquired by the information acquisition unit on the basis of the detected motion of the information processing apparatus.

(10) The information processing apparatus according to (9), in which
the signal output unit outputs a second haptic signal for presenting haptic feedback corresponding to the type of the electronic information selected by the information selection unit.

REFERENCE SIGNS LIST 1 information processing apparatus
30, 40 container
11 controller
14 sensor unit
16 memory unit
17 vibration generator
31 liquid
41 coins
101 motion detector
102 information selection unit
103 information acquisition unit
104 waveform determination unit
105 signal supply unit

The invention claimed is:

1. An information processing apparatus, comprising:
an information acquisition unit configured to acquire electronic information, wherein the electronic information includes a determined type of information among a plurality of types of information and a determined amount corresponding to the electronic information; and
a signal output unit configured to output a first haptic signal to present a haptic feedback with respect to an object, wherein
the haptic feedback with respect to the object is set corresponding to the acquired electronic information,
the haptic feedback with respect to the object includes a specific haptic feedback with respect to a container that contains the object corresponding to the acquired electronic information, and
the haptic feedback with respect to the object includes the specific haptic feedback that appears in case the container that contains the object corresponding to the determined type of information of an amount corresponding to the determined amount is moved.

2. The information processing apparatus according to claim 1, further comprising:
a motion detector configured to detect a motion of the information processing apparatus, wherein
the signal output unit is further configured to output the first haptic signal to present the haptic feedback that appears in case the container is moved based on the detected motion of the information processing apparatus.

3. The information processing apparatus according to claim 1, wherein
the electronic information includes a remaining battery charge, and
the haptic feedback with respect to the object includes the specific haptic feedback that appears in case the container that contains liquid of an amount that corresponds to the remaining battery charge is moved.

4. The information processing apparatus according to claim 1, wherein
the electronic information includes an electronic money balance, and
the haptic feedback with respect to the object includes the specific haptic feedback that appears in case the container that contains coins of an amount that corresponds to the electronic money balance is moved.

5. The information processing apparatus according to claim 1, wherein the signal output unit is further configured to output, as the first haptic signal, a drive signal to drive a haptic feedback presentation unit that presents the haptic feedback with respect to the object by a vibration.

6. The information processing apparatus according to claim 1, further comprising
a motion detector configured to detect a motion of the information processing apparatus, wherein the information acquisition unit is further configured to acquire the electronic information in a case where a determined motion of the information processing apparatus is detected.

7. The information processing apparatus according to claim 6, further comprising
an information selection unit configured to select the determined type of information acquired by the information acquisition unit based on the detected motion of the information processing apparatus.

8. The information processing apparatus according to claim 7, wherein the signal output unit is further configured to output a second haptic signal to present the haptic feedback that corresponds to the determined type of information selected by the information selection unit.

9. An information processing method, comprising:
in a computer system:
acquiring electronic information, wherein the electronic information includes a determined type of information among a plurality of types of information and a determined amount corresponding to the electronic information; and
outputting a haptic signal for presenting a haptic feedback with respect to an object, wherein
the haptic feedback with respect to the object is set corresponding to the acquired electronic information,
the haptic feedback with respect to the object includes a specific haptic feedback with respect to a container that contains the object corresponding to the acquired electronic information, and
the haptic feedback with respect to the object includes the specific haptic feedback that appears in case the container that contains the object corresponding to the determined type of information of an amount corresponding to the determined amount is moved.

10. A non-transitory computer-readable medium having stored thereon, computer-executable instructions which, when executed by a processor, cause the processor to execute operations, the operations comprising:
acquiring electronic information, wherein the electronic information includes a determined type of information among a plurality of types of information and a determined amount corresponding to the electronic information; and
outputting a haptic signal for presenting a haptic feedback with respect to an object, wherein the haptic feedback with respect to the object is set corresponding to the acquired electronic information, the haptic feedback with respect to the object includes a specific haptic feedback with respect to a container that contains the object corresponding to the acquired electronic information, and the haptic feedback with respect to the object includes the specific haptic feedback that appears in case the container that contains the object corresponding to the determined type of information of an amount corresponding to the determined amount is moved.

11. An information processing system, comprising:

a first information processing apparatus configured to acquire electronic information, wherein the electronic information includes a determined type of information among a plurality of types of information and a determined amount corresponding to the electronic information; and a second information processing apparatus configured to:
communicate with the first information processing apparatus to acquire the electronic information from the first information processing apparatus; and output a haptic signal to present a haptic feedback with respect to an object, wherein the haptic feedback with respect to the object is set corresponding to the electronic information acquired by the first information processing apparatus, the haptic feedback with respect to the object includes a specific haptic feedback with respect to a container that contains the object corresponding to the acquired electronic information, and the haptic feedback with respect to the object includes the specific haptic feedback that appears in case the container that contains the object corresponding to the determined type of information of an amount corresponding to the determined amount is moved.

12. The information processing apparatus according to claim 7, wherein the motion detector is further configured to detect a direction and a speed of the motion of the information processing apparatus, and the information selection unit is further configured to select the determined type of information based on the direction and the speed of the motion.

13. The information processing apparatus according to claim 12, wherein in a case where a motion distance of the information processing apparatus in a first direction that includes a vertical component is greater than a first determined threshold value, the information selection unit is further configured to select a remaining battery charge as the determined type of information, in a case where the motion distance is equal to or less than the first determined threshold value, the motion detector is further configured to determine the motion distance of the information processing apparatus in a second direction that includes a horizontal component, and in a case where the motion distance of the information processing apparatus in the second direction that includes the horizontal component is greater than a second determined threshold value, the information selection unit is further configured to select an electronic money balance as the determined type of information.

* * * * *